(12) United States Patent
Julien et al.

(10) Patent No.: US 12,342,114 B2
(45) Date of Patent: Jun. 24, 2025

(54) MOTOR VEHICLE WITH SOUND SYSTEM

(71) Applicant: DEVIALET, Paris (FR)

(72) Inventors: Vincent Julien, Villepinte (FR); Baptiste Loïc Robin Vericel, Lyons (FR)

(73) Assignee: DEVIALET, Paris (FR)

( * ) Notice: Subject to any disclaimer, the term of this patent is extended or adjusted under 35 U.S.C. 154(b) by 134 days.

(21) Appl. No.: 17/851,149

(22) Filed: Jun. 28, 2022

(65) Prior Publication Data

US 2023/0007373 A1    Jan. 5, 2023

(30) Foreign Application Priority Data

Jul. 2, 2021 (FR) ..................................... 21 07187

(51) Int. Cl.
*H04R 1/02* (2006.01)
*H04R 1/26* (2006.01)
(Continued)

(52) U.S. Cl.
CPC ............. *H04R 1/025* (2013.01); *H04R 1/26* (2013.01); *H04R 1/2826* (2013.01);
(Continued)

(58) Field of Classification Search
CPC ........ H04R 1/025; H04R 1/26; H04R 1/2826; H04R 1/2834; H04R 9/06; H04R 2499/13
(Continued)

(56) References Cited

U.S. PATENT DOCUMENTS 5,193,118 A * 3/1993 Latham-Brown ........................... B60R 11/0217
381/86
2005/0213786 A1* 9/2005 Kerneis ................... H04R 5/02
381/302

(Continued)

FOREIGN PATENT DOCUMENTS

FR          2 975 857      11/2012
WO     WO 2021/068028      4/2021

OTHER PUBLICATIONS

Search Report for EP 22182276 dated Nov. 29, 2022.
Preliminary Search Report for FR 895463 dated Feb. 21, 2022.

*Primary Examiner* — William A Jerez Lora
(74) *Attorney, Agent, or Firm* — B. Aaron Schulman, Esq.; Stites & Harbison, PLLC

(57) ABSTRACT

A motor vehicle (10) defining a longitudinal axis (X), a front side, and a median (P) plane including the longitudinal axis (X) and which is vertical, and comprising:
a structure (14) comprising a bulkhead (34),
at least one front seat (26A) for a driver, and
a floor covering (18), the bulkhead and the floor covering partially delimiting a passenger compartment (35), and
a sound system (12) including at least one speaker enclosure (42) rigidly attached to the structure, the speaker enclosure comprising at least one woofer (50A) and being located close to the median plane (P):
either longitudinally between the bulkhead and a front edge of the front seat,
or longitudinally astride a front zone (40A) of the passenger compartment intended to receive the driver and a rear zone (40B) of the passenger compartment intended to receive one or more rear passengers of the motor vehicle.

9 Claims, 7 Drawing Sheets

Figure 1:
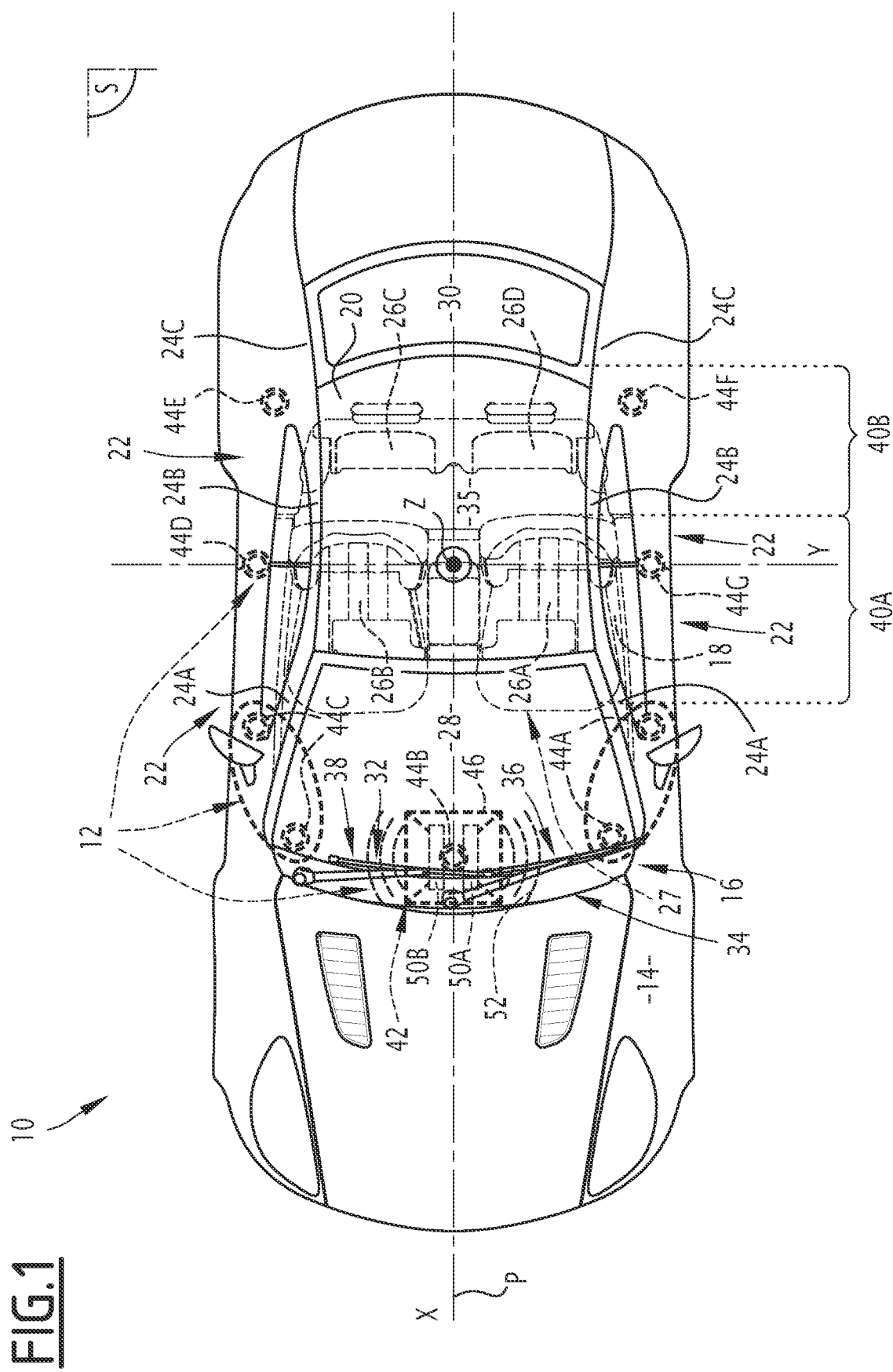

(51) Int. Cl.
*H04R 1/28* (2006.01)
*H04R 9/06* (2006.01)

(52) U.S. Cl.
CPC ............. *H04R 1/2834* (2013.01); *H04R 9/06* (2013.01); *H04R 2499/13* (2013.01)

(58) Field of Classification Search
USPC .......................................... 381/59, 86, 302
See application file for complete search history.

(56) References Cited

U.S. PATENT DOCUMENTS

2018/0020290 A1* 1/2018 Ludwig ................ H04R 1/2846
2020/0245067 A1* 7/2020 Moriki ................. H04R 1/2811

* cited by examiner

MOTOR VEHICLE WITH SOUND SYSTEM

BACKGROUND OF THE INVENTION

Field of the Invention

The present invention relates to a motor vehicle of the type defining a central longitudinal axis along which the vehicle is intended to move, a front side along the longitudinal axis, and a median plane of the vehicle, the median plane including the longitudinal axis and being vertical when the vehicle is on a horizontal surface, the vehicle comprising:
  a structure,
  a front panel applied onto the structure and formed by a dashboard and a vehicle bulkhead, and
  a floor covering, the front panel and the floor covering partially delimiting a passenger compartment of the vehicle,
  the vehicle further comprising a sound system including at least one woofer.

The present invention further relates to a corresponding method for generating sound in a motor vehicle.

DESCRIPTION OF RELATED ART

Traditionally, personal motor vehicles or taxis comprised one or more equivalent loudspeakers which were apt to generate sound waves over a relatively wide range. Such a sound system cannot achieve a very high quality of sound.

To improve said quality, some more modern sound systems include speakers located at the bottom of the door, which generally can reproduce bass frequencies, below 200 Hz, and also slightly higher frequencies up to 1000 or 2000 Hz. Such sound systems then generally include other speakers for medium-frequency sounds, with frequencies comprised between 200 Hz and a value between 1 kHz and 6 kHz, and/or high frequencies above a value comprised between 1 kHz and 6 kHz which could go up 14 or 20 kHz. Such speakers were for example located in the vehicle dashboard, which comprises the instrument panel in front of the driver, and a transverse extension of the instrument panel located directly in front of a possible passenger. Such sound systems cannot yet achieve very high sound quality.

Current high-end sound systems comprise a dedicated subwoofer for frequencies from 20 Hz to 60 Hz. The subwoofer is usually located in the trunk or under a front seat of the vehicle.

However, this under-seat placement is not practical, due to a lack of space. The trunk provides more space, but is not a good source of bass sounds, in particular due to poor transfer to the passenger compartment of frequencies around 60 to 70 Hz.

More recently, some of the players in the field have developed sound systems comprising one or two bass loudspeakers (woofers), acting as a subwoofer, and integrated into the vehicle bulkhead, i.e., the part of the structure separating the passenger compartment from a front housing wherein the engine is usually located. The membrane of the loudspeakers is for example located in the extension the bulkhead. In this way, a good sound quality can be achieved, but the disadvantage is that the bulkhead has to be designed to accommodate the woofers. In practice, the vehicle manufacturer has to adapt the bulkhead, which must be anticipated well ahead during the design of the vehicle.

Another known solution is to include one or more woofers into openings towards the passenger compartment, for example near one of the rear wheels. The loudspeaker or the loudspeakers emit from these openings. A fault of such solution is that it requires to significantly modify the vehicle and to treat the external noise coming through said openings.

One purpose of the invention is to provide a motor vehicle of the type described above, with a high-end sound system that is easier and/or cheaper to implement.

BRIEF SUMMARY OF THE INVENTION

For this purpose, the subject matter of the present invention relates to a motor vehicle defining a central longitudinal axis along which the motor vehicle is intended to move, a front side along the longitudinal axis, and a median plane of the motor vehicle, the median plane including the longitudinal axis and being vertical when the motor vehicle is on a horizontal surface, the motor vehicle comprising:
  a structure comprising a bulkhead,
  at least one front seat intended to seat a driver of the motor vehicle,
  a floor covering, the bulkhead and the floor covering partially delimiting a passenger compartment of the motor vehicle, and
  a sound system including at least one speaker enclosure rigidly attached to the structure, the speaker enclosure comprising:
  a box defining at least one first opening, and
  at least one first woofer fitted into the opening,
the speaker enclosure being located close to the median plane:
  either longitudinally between the bulkhead and a front edge of the front seat,
  or longitudinally astride a front zone of the passenger compartment intended to receive the driver and a rear zone of the passenger compartment intended to receive one or more rear passenger of the motor vehicle.

According to particular embodiments, the motor vehicle comprises one or more of the following characteristics, taken individually or according to all technically possible combinations:
  The first woofer has a bandwidth including a frequency range from 60 Hz to 150 Hz;
  the speaker enclosure has a barycenter located 20 cm or less from the median plane;
  the box further defines a second opening, the speaker enclosure further comprising a second woofer structurally similar to the first woofer, the second woofer being mounted in the second opening, back-to-back with the first woofer;
  the first woofer and the second woofer comprise two magnetic motors respectively, the speaker enclosure comprising at least one metal rod which mechanically connects the two magnetic motors to each other;
  the speaker enclosure defines an interior volume intended to receive sound waves generated by at least the first woofer, the box further including at least one vent apt to channel at least some of the sound waves from the interior volume to the exterior of the speaker enclosure;
  the box defines at least one or two additional opening(s), the speaker enclosure further comprising at least one or two passive membrane(s) mounted so as to be able to move with regard to the box in the additional opening or openings respectively, the passive membrane or membranes being apt to emit sound waves;
  the sound system also comprises at least one medium- and high-frequency loudspeaker with a bandwidth ranging from a frequency between 150 Hz and 350 Hz to a frequency of at least 14 kHz, said medium- and high-frequency loudspeaker being located in the passenger compartment; and the sound system further includes: at least one medium-frequency loudspeaker with a band ranging from 150 Hz to 600 Hz to a frequency between 1 kHz and 6 kHz; and at least one high-frequency loudspeaker with a bandwidth including a range from a frequency between 1 kHz and 6 kHz to a frequency of at least 14 kHz, said medium-frequency loudspeaker and said high-frequency loudspeaker being located in the passenger compartment.

The further subject matter of the invention is a sound generation method comprising the following steps:

supplying a motor vehicle, and emitting sound waves by at least the first woofer of the speaker enclosure.

BRIEF DESCRIPTION OF THE SEVERAL VIEWS OF THE DRAWING(S)

Figure 2:
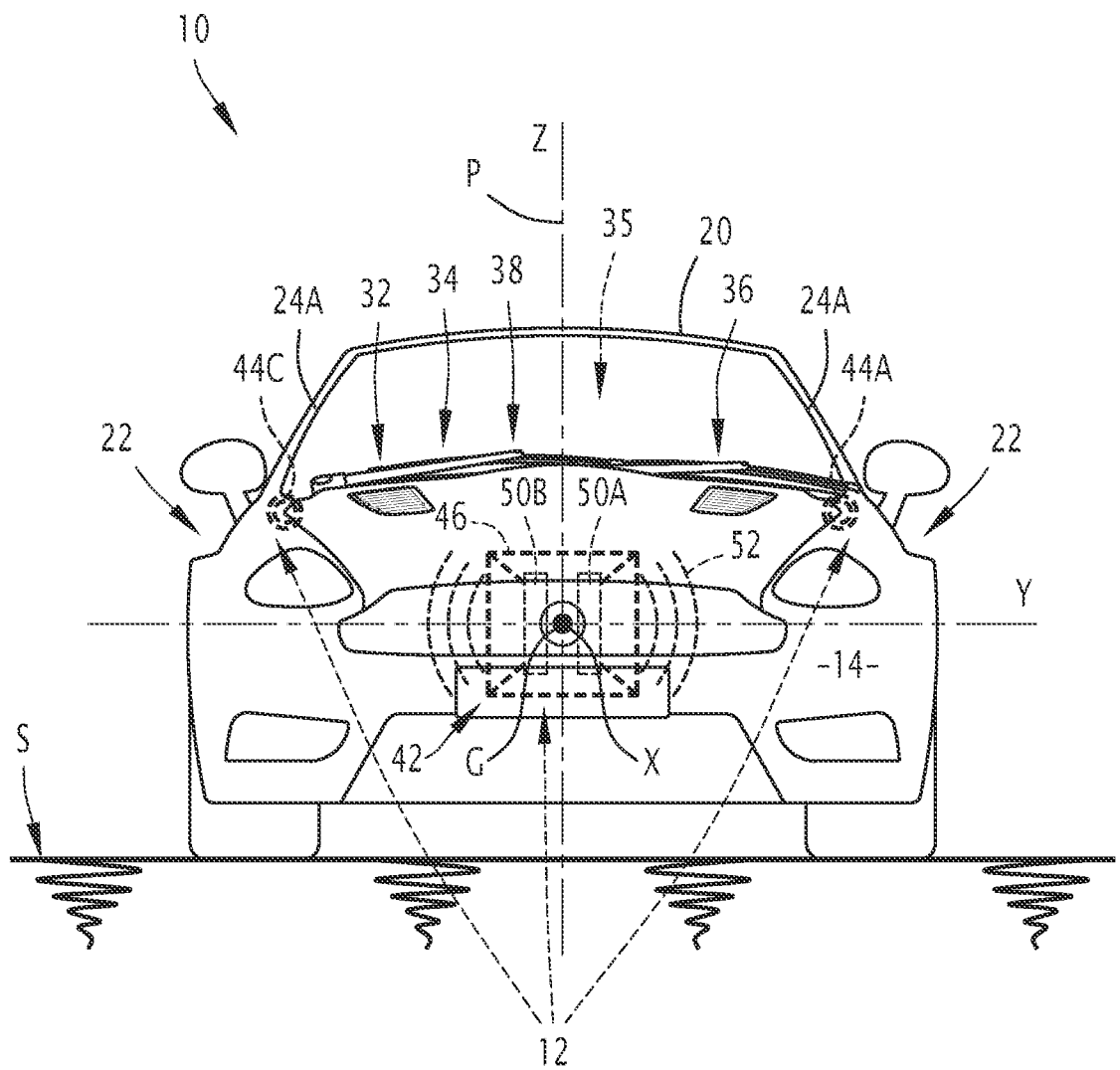
Figure 3:
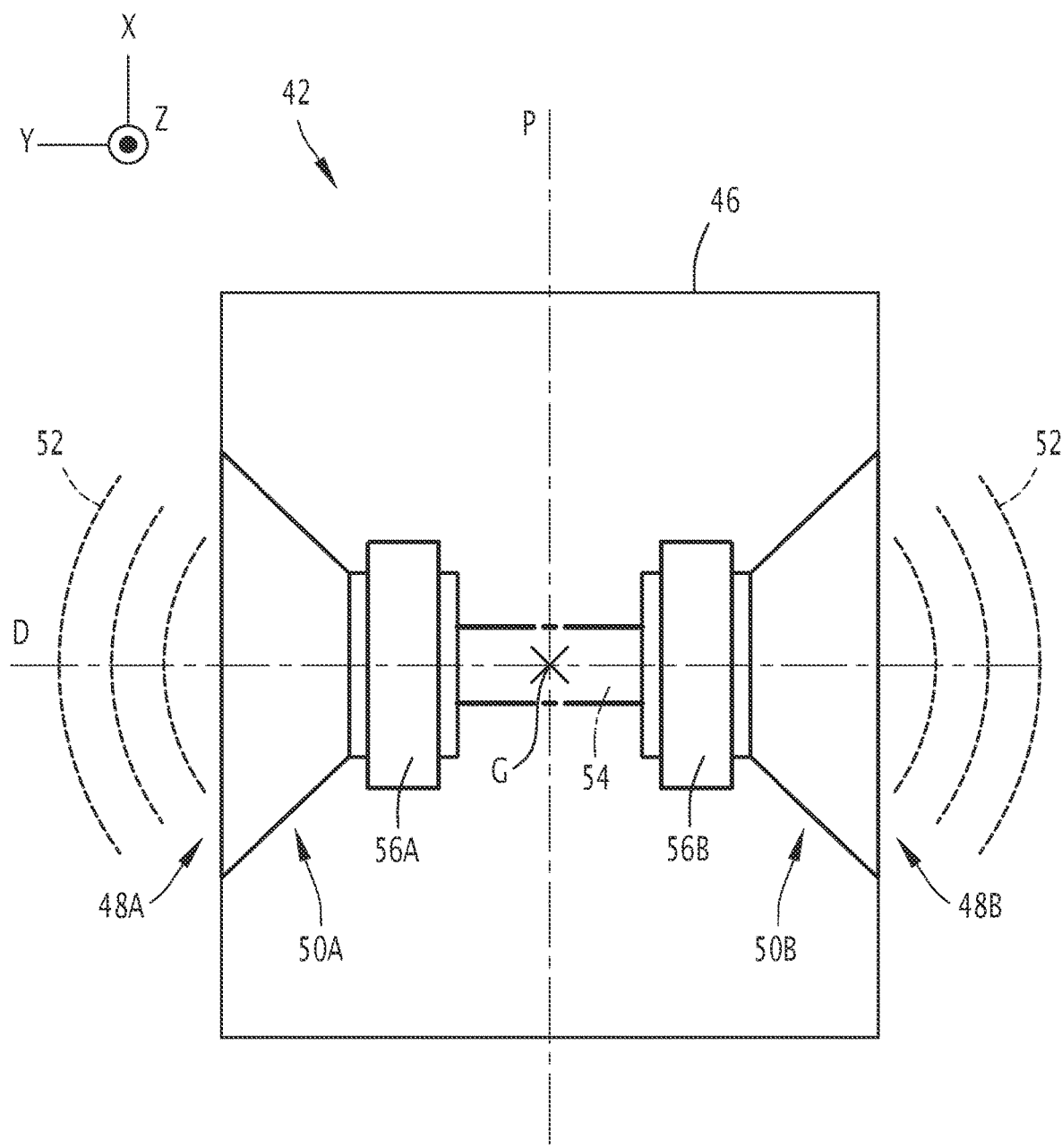

The invention will be better understood reading the following description, given only as an example and making reference to the drawings annexed thereto, wherein:

FIG. 1 is a schematic view of the top of a motor vehicle according to the invention, FIG. 2 is a schematic view of the front of the motor vehicle shown in FIG. 1, FIG. 3 is a schematic top view of a speaker enclosure shown in FIGS. 1 and 2, FIGS. 4 to 6 are schematic top views of speaker enclosures that are variants of the speaker enclosure shown in FIGS. 1 to 3, and FIG. 7 is a schematic top view of a motor vehicle that is a variant of the motor vehicle shown in FIGS. 1 and 2, with the speaker enclosure positioned at a different location with regard to the passenger compartment.

DETAILED DESCRIPTION OF THE INVENTION

With reference to FIGS. 1 and 2, a motor vehicle 10 equipped with a sound system 12, is described.

The motor vehicle 10 is for example a private car or a taxi.

The motor vehicle 10 defines a central longitudinal axis X, along which same is intended to move, and a front side along the longitudinal axis X, as indicated by the normal direction of travel of the motor vehicle. A median plane P is further defined through the longitudinal axis X and which is vertical when the motor vehicle 10 is on a horizontal surface S. A transverse axis Y is further defined perpendicular to the median plane, and a vertical axis Z perpendicular to the longitudinal axis X and to the transverse axis Y.

The motor vehicle 10 comprises a structure 14 designed to provide a certain rigidity, a front panel 16, and a floor covering 18.

The motor vehicle 10 also includes a ceiling 20, side doors 22 and uprights 24A, 24B, 24C extending at least vertically from the ceiling downwards. These uprights are sometimes called "feet" in the automotive field.

The motor vehicle 10 includes two, four, or a plurality of side doors 22.

In the example, the vehicle has four side doors 22 serving four seats 26A, 26B, 26C, 26D.

According to variants not shown and known per se, the motor vehicle 10 comprises for example:

two side doors serving two seats, four, five or six seats, or more than four side doors serving more than four seats.

According to a particular embodiment, some of the seats, such as seats 26C and 26D, are formed by one bench or by benches.

The uprights 24A, 24B, 24C form symmetrical pairs with respect to the median plane P.

In the example shown, the two uprights 24A separate a front windscreen 28 from the front doors 22. The two uprights 24B separate the front doors 22 from the rear doors 22. The two uprights 24C separate the rear doors 22 from a rear windscreen 30.

The front panel 16 comprises a dashboard 32 attached to a bulkhead 34 of the structure.

The bulkhead 34 and floor covering 18 partially delimit a passenger compartment 35 of the motor vehicle 10.

The dashboard 32 comprises an instrument panel 36 located in front of a driver (not shown) of the motor vehicle 10, and a transverse extension 38 of the instrument panel 36, with the transverse extension located in front of a possible front passenger (not shown; said passenger would be seated in seat 26B).

The bulkhead 34 is a structural part located longitudinally in front of the dashboard 32. The bulkhead 34 extends vertically for example from the base of the windscreen of vehicle 10 down to the driver's feet.

The passenger compartment 35 comprises, successively along the longitudinal axis X, a front zone 40A intended to receive the driver, and a rear zone 40B intended to receive passengers behind the driver.

The front zone 40A and the rear zone 40B are for example separated from each other along the longitudinal direction X by a rear side of the seat 26A.

The sound system 12 comprises an speaker enclosure 42, and optionally one or a plurality of other loudspeakers 44A to 44G located in passenger compartment 35.

As seen in FIGS. 1 and 2, but especially in FIG. 3, the speaker enclosure 42 comprises a box 46 defining two openings 48A, 48B, and two woofers 50A, 50B respectively mounted in the two openings.

The speaker enclosure 42 is located near the median plane P. For example, the speaker enclosure 42, with all that same contains, has a barycenter G located 20 cm or less from the median plane P. For example the barycenter G is located within the median plane P.

The speaker enclosure 42 is rigidly attached to the structure 14. The speaker enclosure 42 is located longitudinally between the bulkhead 34 and a front edge 27 of the seat 26A.

If the position of the seat 26A is adjustable along the longitudinal direction X, the speaker enclosure 42 is located longitudinally at the front of the front edge 27 when the seat 26A is located in the rearmost position thereof (not shown). Preferentially, the speaker enclosure 42 is also located longitudinally at the front edge 27 when the seat 26A is located in the middle position thereof (not shown) between the rearmost position thereof and the frontmost position thereof.

The structure of the speaker enclosure 42 (number and structure of the loudspeakers, for example the shape of the box 46), does not require any modification of the structure of the bulkhead 34.

The box 46 has for example a parallelepiped shape.

The box 46 is intended to form a "universal support", in the example for the 50A, 50B woofers, said woofers belonging for example to a predefined range. The box 46 advantageously has pre-defined dimensions compared to the front panel 16.

"Woofer" refers for example to a loudspeaker which has a structure (known per se to a person skilled in the art) apt to emit sound waves 52 in a bandwidth that includes a frequency range from 60 Hz to 150 Hz.

Advantageously, the woofer bandwidth includes the range from 20 Hz to 60 Hz, or even from 15 Hz to 60 Hz, making the speaker enclosure 42 a subwoofer.

The woofers 50A, 50B are advantageously structurally similar to each other and arranged back-to-back along an axis D, for example substantially parallel to the transverse axis Y, in order to reduce the vibrations generated by the speaker enclosure 42.

Advantageously, a metal rod 54 connects the magnetic motors 56A, 56B of the woofers 50A, 50B, further reducing the vibrations.

The other loudspeakers 44A to 44G are not part of the speaker enclosure 42 and are for example visible from the passenger compartment 35.

The other loudspeakers 44A to 44G comprise for example one or a plurality of medium- and high-frequency loudspeakers 44B, 44D, 44G with a bandwidth ranging from a frequency comprised between 150 Hz and 350 Hz to a frequency of at least 14 kHz. In addition or as a variant, the other loudspeakers 44A to 44G comprise for example one or a plurality of medium-frequency loudspeakers 44E, 44F with a bandwidth ranging from a frequency of 150 Hz to 350 Hz to 1 kHz to 6 kHz, and a high-frequency loudspeaker 44B, or in a variant, a plurality of loudspeakers with a bandwidth ranging from a frequency of 1 kHz to 6 kHz to a frequency of at least 14 kHz.

The other loudspeakers 44A to 44G, independently of the acoustic characteristics thereof, are advantageously located near or in the uprights 24A (for the loudspeakers 44C and 44A in the example shown), the uprights 24B (for the loudspeakers 44D and 44G in the example), or the uprights 24C (for the loudspeakers 44E and 44F). The loudspeakers 44A and 44C are for example located in the dashboard 32, in the uprights 24A, or in triangles at the rear-view mirrors of the motor vehicle 10.

According to other variants, all or some of the other loudspeakers 44A to 44G are in doors 22, or in the roof of the motor vehicle.

Figure 4:
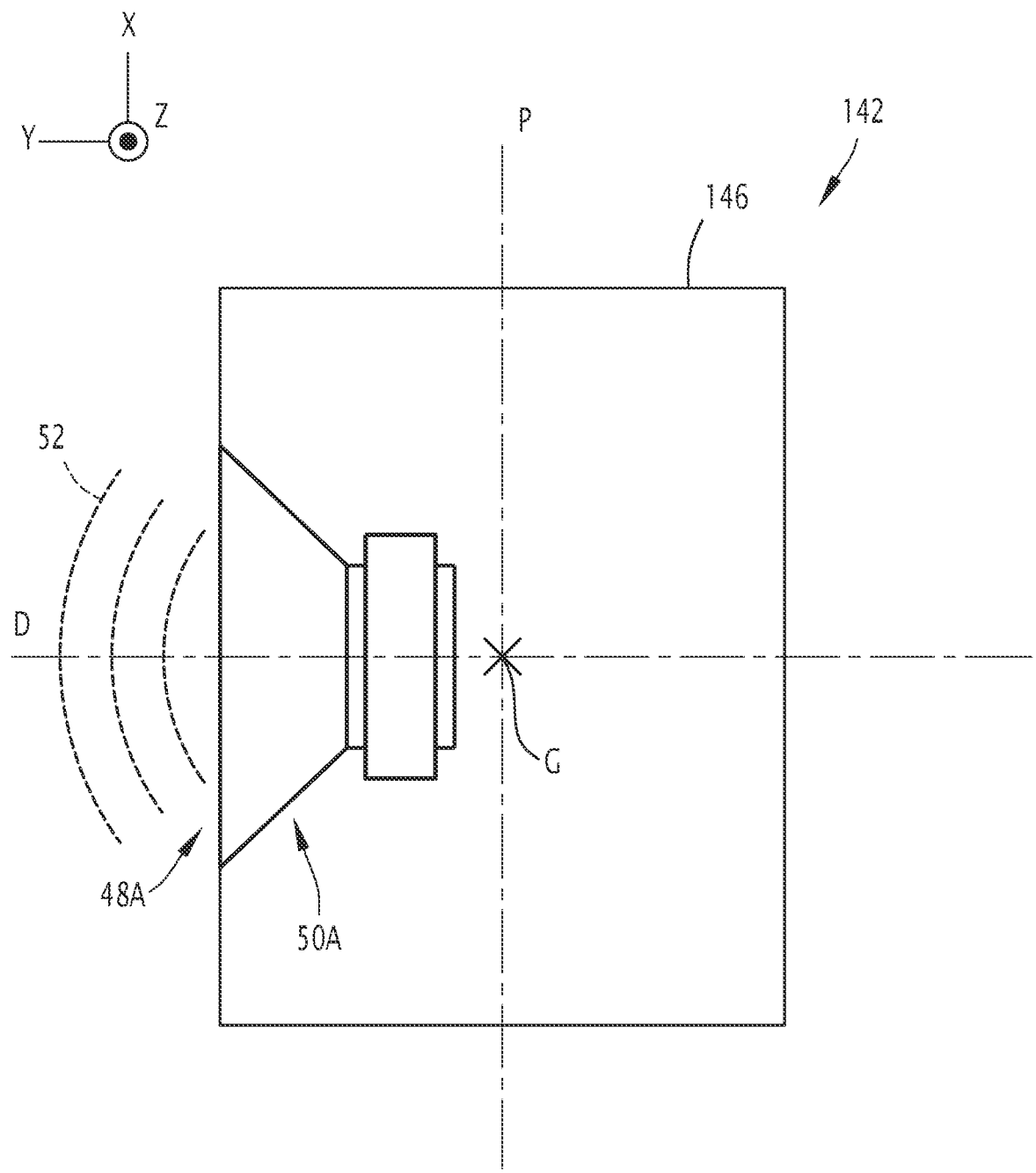

The other loudspeakers 44A to 44G are positioned symmetrically with regards to the middle plane P With reference to FIG. 4, a speaker enclosure 142 is described as a first variant of the speaker enclosure 42. The speaker enclosure 142 is similar to speaker enclosure 42 as shown in FIGS. 1 to 3. Similar elements have the same numeric references and will not be described again. Only the differences will be described in detail below.

The speaker enclosure 142 comprises a box 146 similar to box 46 but defining only one opening 48A. The speaker enclosure 142 comprises only one woofer 50A.

Figure 5:
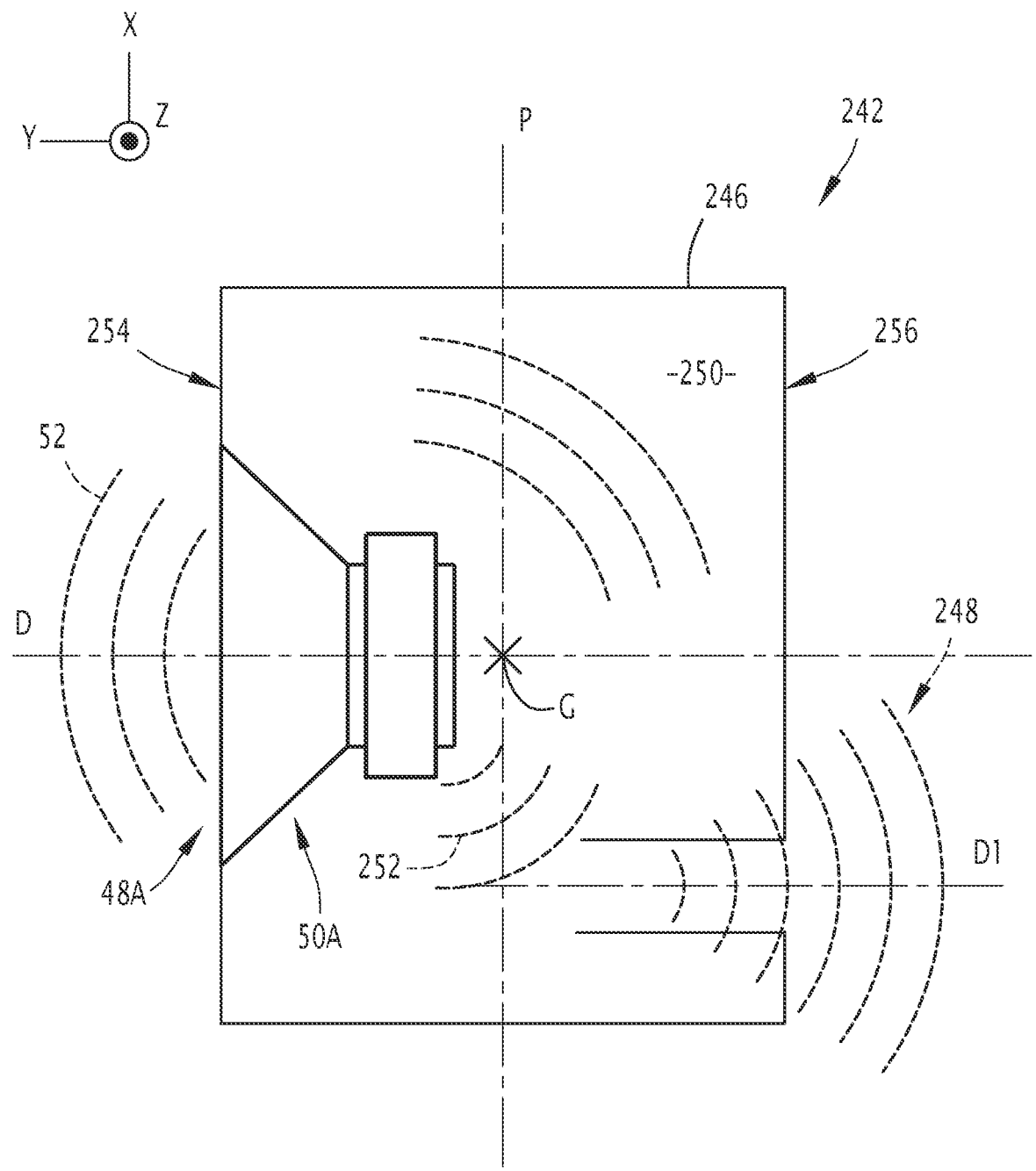

With reference to FIG. 5, a speaker enclosure 242 is described as a second variant of the speaker enclosure 42. The speaker enclosure 242 is similar to speaker enclosure 42 as shown in FIGS. 1 to 3. Similar elements have the same numeric references and will not be described again. Only the differences will be described in detail below.

The speaker enclosure 242 comprises a box 246 similar to box 46 but defining only one opening 48A and defining a vent 248. The speaker enclosure 142 comprises only one woofer 50A.

The speaker enclosure 242 defines an interior volume 250 intended to receive sound waves 252 generated with the subwoofer 50A, the vent 248 being apt to channel at least part of the sound waves 252 from the interior volume 250 to the exterior of the speaker enclosure 242.

The vent 248 and the woofer 50A are located for example on two opposite sides 254, 256 of the box 246 along the axis D of the woofer.

Figure 6:
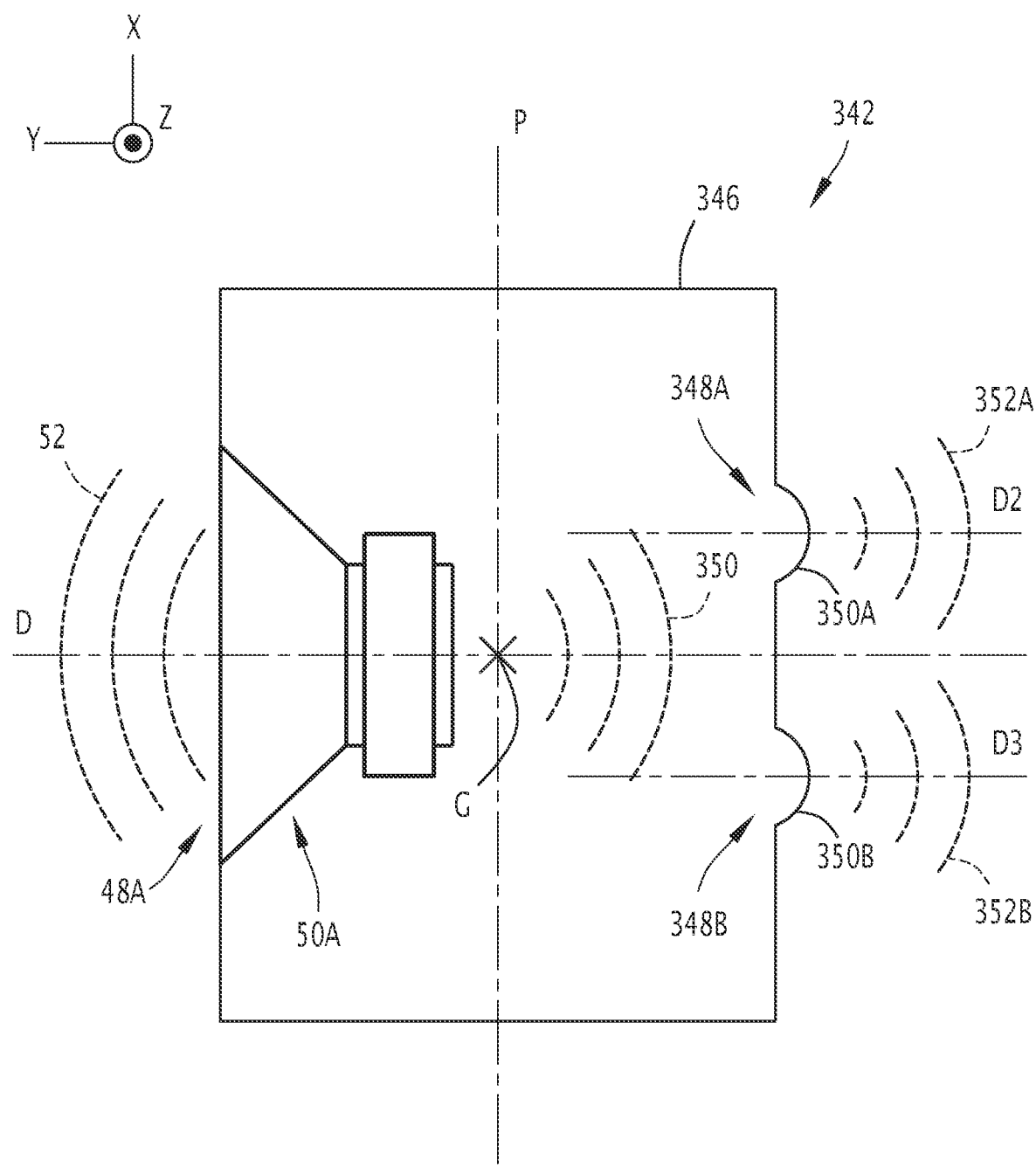

With reference to FIG. 6, a speaker enclosure 342 is described as a third variant of the speaker enclosure 42. The speaker enclosure 342 is similar to speaker enclosure 42 as shown in FIGS. 1 to 3. Similar elements have the same numeric references and will not be described again. Only the differences will be described in detail below.

The speaker enclosure 342 comprises a box 346 that defines only one opening 48A for only one woofer 50A. The box 346 further defines two additional openings 348A, 348B, the speaker enclosure 342 further comprising two passive membranes 350A, 350B mounted so as to be movable with regard to the box in the additional openings.

According to variants which are not shown, the loudspeaker 342 can comprise one passive loudspeaker (also called a "passive radiator"), or more than two. The speaker enclosure 342 can have an arbitrary number of active loudspeakers and an arbitrary number of passive loudspeakers.

The passive membranes 350A, 350B are apt to emit sound waves 352A, 352B outside the speaker enclosure 342. The passive membranes 350A, 350B work as secondary sources excited by the sound waves 350 emitted by the woofer 50A in the box 346.

The passive membranes 350A, 350B are for example located on the same face of box 346, advantageously opposite the face defining the opening 48A.

The operation of the motor vehicle 10, or more precisely the sound system 12 thereof, is derived from the structure thereof and will be described now very briefly.

The bass sounds are emitted by the woofers 50A and 50B from the rear side of the bulkhead 34 and are propagated into the passenger compartment 35.

The medium or high-pitched sounds are emitted by the other loudspeakers 44A to 44G directly inside the passenger compartment 35.

Due to the features described above, in particular the speaker enclosure 42, or the variants 142, 242, 342 thereof, the sound system 12 of the motor vehicle 10 provides high-end performance. Same system is easier and cheaper to implement, because, whatever the range thereof, as defined by the structural characteristics of the speaker enclosures 42, 142, 242, 342 (number and types of woofers, possible presence of the vent 248 or of the passive membranes 350A, 350B, etc.), the speaker enclosure is easily integrated into the motor vehicle 10 without the need to adapt the bulkhead 34. This is made possible by the boxes 46, 146, 246, 346, which are apt to be fixed onto a standard support (the structure 14 of the motor vehicle and/or the front panel 16).

The box 46 is a not far longitudinally from the bulkhead 34, which contributes to the good propagation of the sound waves 52 toward the rear through the passenger compartment 35. The position of the speaker enclosure 12 close to the middle plane P further allows the bass sounds to be well distributed across passenger compartment 35.

In addition to the modularity thereof, the sound system 12 saves weight, space, and reduces vibration, especially when the speaker enclosure has two back-to-back woofers, which are advantageously connected by the rod 54.

Figure 7:
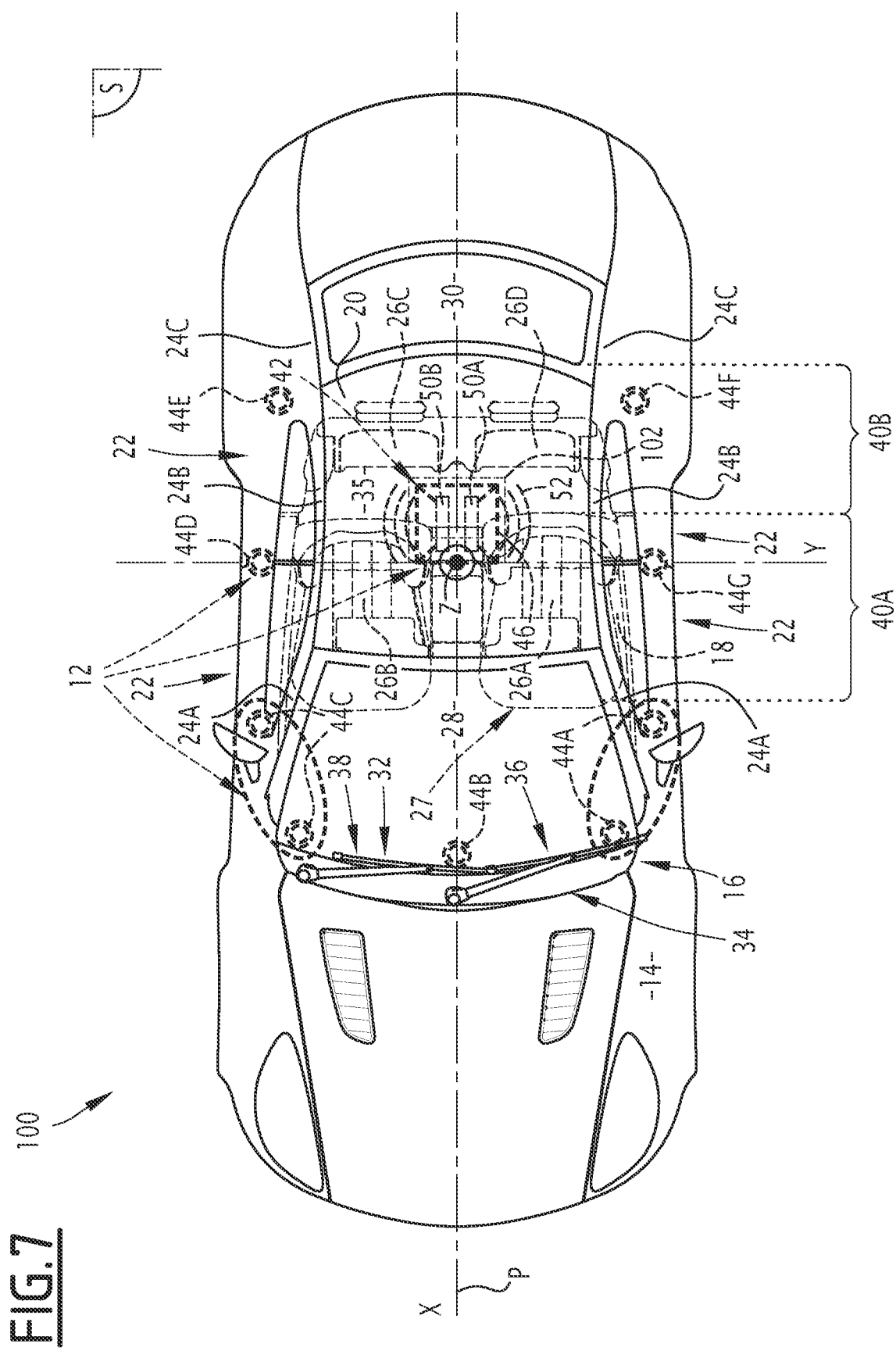

With reference to FIG. 7, a motor vehicle 100 will be now described as a variant of the motor vehicle 10. The motor vehicle 100 is similar to the motor vehicle 10 shown in FIGS. 1 to 2. Similar elements have the same numeric references and will not be described again. Only the differences will be described in detail below.

In the motor vehicle 100, the speaker enclosure 42 is not located longitudinally (along the longitudinal axis X) between the bulkhead 34 and the front edge 27 of the 26A seat, but astride the front zone 40A (provided in the example for the driver) and the rear zone 40B (provided in the example to seat possible rear passengers), for example under the floor covering 18, and always close to the median plane P.

The speaker enclosure 42 is therefore not located longitudinally at the seats 26A, 26B, but further at the rear. According to a particular embodiment, the barycenter G of the speaker enclosure 42 is located in the rear zone 40B.

In a variant, the speaker enclosure 42 is not located under the floor covering 18, but in a rear console 102 in front of possible rear passengers.

Such a position of speaker enclosure 42 is for example suitable for a vehicle used as a taxi, in order to ensure optimal sound for the rear passengers.

The motor vehicle 100 has the same advantages as the vehicle 10, in particular the modularity thereof, as it is possible to change the quality of the speaker enclosure 42 without having to modify the passenger compartment 35, the box 46 substantially keeping the same dimensions and being apt to be attached onto standard parts.

The invention claimed is:

1. A motor vehicle defining a central longitudinal axis along which the motor vehicle is intended to move, one front side along the longitudinal axis, and a median plane of the motor vehicle, the median plane including the longitudinal axis and being vertical when the motor vehicle is on a horizontal surface, the motor vehicle comprising:
    a structure comprising a bulkhead,
    at least one front seat intended to seat a driver of the motor vehicle,
    a floor covering, the bulkhead and the floor covering partially delimiting a passenger compartment of the motor vehicle, and
    a sound system including at least one speaker enclosure rigidly attached to the structure, the speaker enclosure comprising:
    one box defining at least one first opening, and
    at least one first woofer mounted in the opening,
the speaker enclosure being located close to the median plane:
    either longitudinally between the bulkhead and a front edge of the front seat,
    or longitudinally astride a front zone of the passenger compartment intended to receive the driver and a rear zone of the passenger compartment intended to receive one or more rear passengers of the motor vehicle;
        wherein the box further defines a second opening, the speaker enclosure further comprising a second woofer structurally analogous to the first woofer, the second woofer being mounted in the second opening, back-to-back with the first woofer; and
        wherein the first woofer and the second woofer comprise two magnetic motors respectively, the speaker enclosure comprising at least one metal rod mechanically connecting the two magnetic motors to each other.

2. The motor vehicle according to claim 1, wherein the first woofer has a bandwidth including a frequency range from 60 Hz to 150 Hz.

3. The motor vehicle according to claim 1, wherein the speaker enclosure has a barycenter located 20 cm or less from the median plane.

4. The motor vehicle according to claim 1, wherein the speaker enclosure defines an interior volume intended to receive sound waves generated at least by the first woofer, the box further comprising at least one vent apt to channel at least part of sound waves from the interior volume to the exterior of the speaker enclosure.

5. The motor vehicle according to claim 1, wherein the box defines at least one or two additional opening(s), the speaker enclosure further comprising at least one or two passive membrane(s) which are mounted as to be movable relative to the box in the additional opening or openings respectively, the passive membrane or membranes being apt to emit sound waves.

6. The motor vehicle according to claim 1, wherein the sound system further comprises at least one medium- and high-frequency loudspeaker with a bandwidth ranging from a frequency between 150 Hz and 350 Hz to a frequency of at least 14 kHz, said medium- and high-frequency loudspeaker being located inside the passenger compartment.

7. The motor vehicle according to claim 1, wherein the sound system further comprises:
    at least one medium-frequency loudspeaker with a band ranging from a frequency comprised 150 Hz to 600 Hz to a frequency comprised between 1 kHz to 6 kHz, and
    at least one high-frequency loudspeaker with a bandwidth including a range from a frequency comprised between 1 kHz to 6 kHz to a frequency of at least 14 kHz, said medium-frequency loudspeaker and said high-frequency loudspeaker being located inside the passenger compartment.

8. A sound generation method comprising:
    supplying a motor vehicle according to claim 1, and
    emitting sound waves at least by the first woofer of the speaker enclosure.

9. A motor vehicle defining a central longitudinal axis along which the motor vehicle is intended to move, one front side along the longitudinal axis, and a median plane of the motor vehicle, the median plane including the longitudinal axis and being vertical when the motor vehicle is on a horizontal surface, the motor vehicle comprising:
    a structure comprising a bulkhead,
    at least one front seat intended to seat a driver of the motor vehicle,
    a floor covering, the bulkhead and the floor covering partially delimiting a passenger compartment of the motor vehicle, and
    a sound system including at least one speaker enclosure rigidly attached to the structure, the speaker enclosure comprising:
    one box defining at least one first opening, and
    at least one first woofer mounted in the opening,
the speaker enclosure being located close to the median plane,
    longitudinally astride a front zone of the passenger compartment intended to receive the driver and a rear zone of the passenger compartment intended to receive one or more rear passengers of the motor vehicle,
wherein the box forms a universal support, and
    the box further defines a second opening, the speaker enclosure being adapted for further comprising a second woofer structurally analogous to the first woofer, and mounted in the second opening, back-to-back with the first woofer.

* * * * *